United States Patent
Carlozzi et al.

(10) Patent No.: US 11,797,505 B2
(45) Date of Patent: Oct. 24, 2023

(54) COLUMN BROWSER FOR NAVIGATING HIERARCHICAL DATA STRUCTURES

(71) Applicant: HEWLETT PACKARD ENTERPRISE DEVELOPMENT LP, Houston, TX (US)

(72) Inventors: Christopher Michael Carlozzi, San Jose, CA (US); Derek Hsun Chen, San Jose, CA (US); Diane Umoh Labenz, San Jose, CA (US); Margaret Carpenter Silva, New Fairfield, CT (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/246,552

(22) Filed: Apr. 30, 2021

(65) Prior Publication Data
US 2022/0350783 A1    Nov. 3, 2022

(51) Int. Cl.
*G06F 16/22*     (2019.01)
*G06F 16/248*    (2019.01)
*G06F 16/28*     (2019.01)

(52) U.S. Cl.
CPC .......... *G06F 16/221* (2019.01); *G06F 16/248* (2019.01); *G06F 16/282* (2019.01); *G06F 16/287* (2019.01)

(58) Field of Classification Search
CPC .................................................... G06F 16/221
USPC ......................................................... 707/805
See application file for complete search history.

(56) References Cited

U.S. PATENT DOCUMENTS

| | | | |
|---|---|---|---|
| 5,566,291 A | 10/1996 | Boulton et al. | |
| 6,202,066 B1* | 3/2001 | Barkley | G06F 21/6218 |
| | | | 707/999.009 |
| 6,236,400 B1 | 5/2001 | Guerrero | |
| D468,748 S | 1/2003 | Inagaki | |
| D528,553 S | 9/2006 | Nevill-Manning et al. | |
| 7,325,201 B2 | 1/2008 | Ferrari et al. | |
| D614,637 S | 4/2010 | Mizulo | |
| D619,602 S | 7/2010 | Ehrler et al. | |
| D664,984 S | 8/2012 | Lee et al. | |

(Continued)

FOREIGN PATENT DOCUMENTS

| | | | |
|---|---|---|---|
| JP | 5566291 B2 | 8/2014 | |
| WO | 2009/043753 A1 | 4/2009 | |
| WO | WO-2010102296 A1 * | 9/2010 | ........... G06F 16/245 |

OTHER PUBLICATIONS appian.com; "Browse Hierarchical Data"; 5 pages; website accessed on Feb. 19, 2021, https://docs.appian.com/suite/help/20.4/recipe-configure-a-columns-browser.html.

*Primary Examiner* — Syling Yen
(74) *Attorney, Agent, or Firm* — Slater Matsil, LLP

(57) ABSTRACT

Examples are provided for a column browser for navigating hierarchical data structures. The column browser can include multiple columns for displaying different levels of the hierarchical data structure and the information, options, and other data stored in nodes of the different levels. The column browser can navigate to different levels of the hierarchical data structure by traversing through parent node and child node links in the hierarchical data structure. Based on the links, the column browser can navigate up or down levels of the hierarchical data structure.

17 Claims, 11 Drawing Sheets

(56) References Cited

U.S. PATENT DOCUMENTS

| | | | |
|---|---|---|---|
| 8,738,414 B1* | 5/2014 | Nagar | G06Q 10/103 |
| | | | 705/7.12 |
| D724,613 S | 3/2015 | Liu et al. | |
| D726,204 S | 4/2015 | Prajapati et al. | |
| D727,935 S | 4/2015 | Myette et al. | |
| 9,354,776 B1 | 5/2016 | Subramanian et al. | |
| 9,606,700 B2 | 3/2017 | Schafer et al. | |
| D824,402 S | 7/2018 | Donnelly | |
| D848,451 S | 5/2019 | Baber et al. | |
| D870,129 S | 12/2019 | Bhardwaj et al. | |
| D949,899 S | 4/2022 | Olson | |
| 2008/0120302 A1* | 5/2008 | Thompson | G06F 21/6209 |
| | | | 707/999.009 |
| 2009/0222762 A1 | 9/2009 | Denver et al. | |
| 2010/0305382 A1 | 12/2010 | Stabel et al. | |
| 2012/0216117 A1 | 8/2012 | Arriola et al. | |

* cited by examiner

COLUMN BROWSER FOR NAVIGATING HIERARCHICAL DATA STRUCTURES

DESCRIPTION OF RELATED ART

As computer technology grows increasingly complex, so too do the technological challenges of developing user interfaces that allow users to effectively comprehend and efficiently utilize the increasingly complex computer technology. As an example of a user interface, a graphical user interface (GUI) allows users to interact with a computing device using visual elements presented on a display. The GUI can facilitate various functions, such as accessing information on the computing device, within a local network, or over the Internet. As developments in computer technology advance, users increasingly rely on computer technology to access information. This increasing reliance on computer technology to access information, along with the increasing complexity of computer technology, exacerbates the technological challenges of developing user interfaces that allow users to effectively comprehend and efficiently utilize computer technology.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
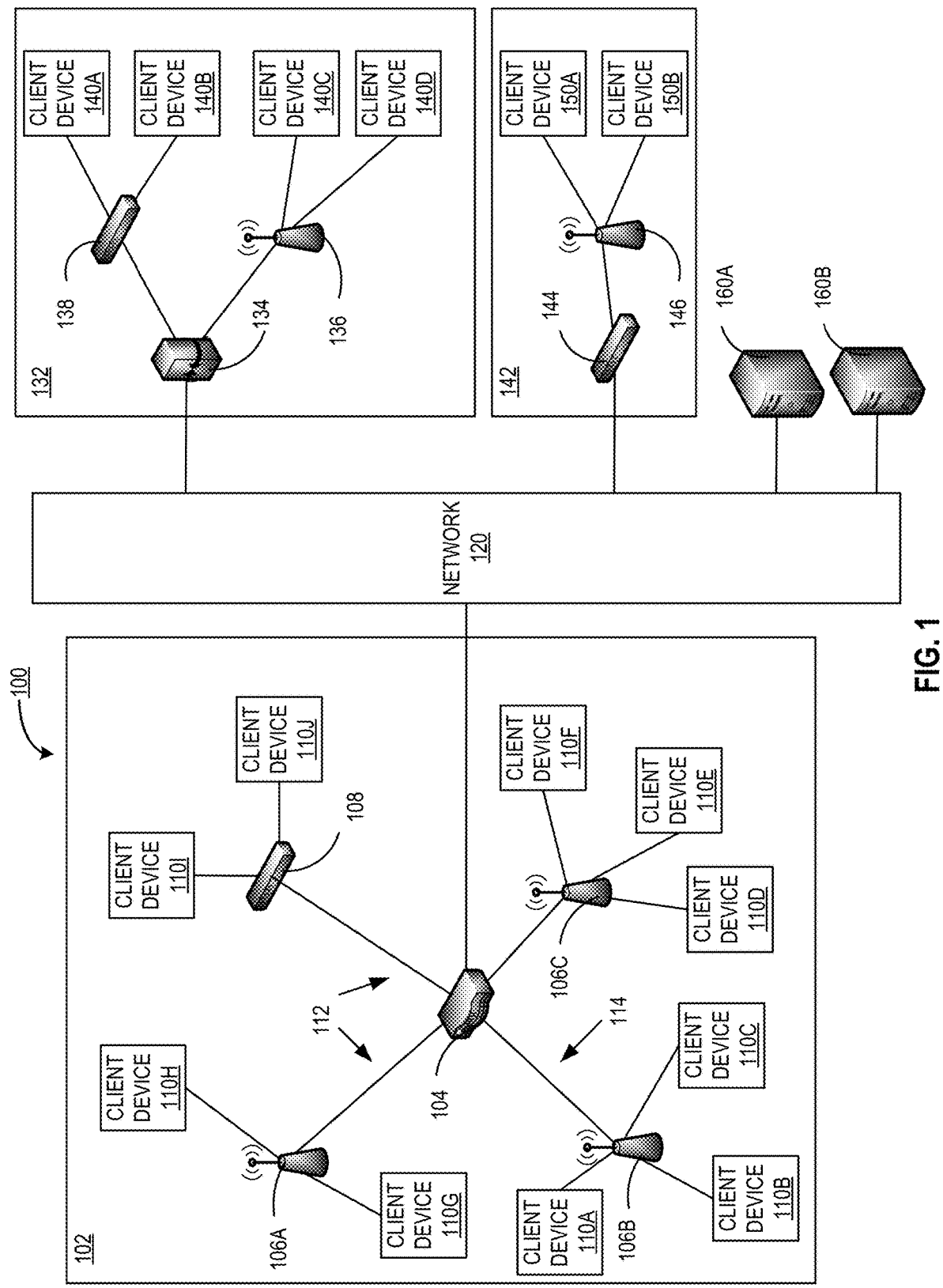
FIG. 1 illustrates an example of network configuration that may be implemented for an organization, such as a business, educational institution, governmental entity, healthcare facility or other organization.

The figures are not exhaustive and do not limit the present disclosure to the precise form disclosed.

DETAILED DESCRIPTION

One of the many technological challenges involved in the development of user interfaces includes visualizing complex data structures. A hierarchical data structure, for example, can be useful for organizing data in an efficient way, but can be technologically challenging to visualize and navigate in a user interface. A hierarchical data structure is a data structure where data is organized in a tree structure. The hierarchical data structures follow a one-to-many relationship. At a top level of the hierarchical data structure, a root node serves as a parent node for many child nodes, which are at a next level, or a level below the root node, of the hierarchical data structure. The nodes at this level can have their own child nodes, which are at a next level, or a level below the nodes, of the hierarchical data structure. The hierarchical data structure can continue with additional levels of nodes. A node without child nodes can be referred to as a leaf node. Hierarchical data structures are useful for organizing various types of data. For example, in a networking environment, a network administrator can be granted various permissions to access, modify, or delete various parts of a network. These permissions can include permissions that depend on other permissions or inherit from other permissions. In this example, a permission that depends on another permission can be organized as a child node of the other permission. As another example, food items on a menu can be organized into different categories, such as breakfast, lunch, and dinner, or appetizer, entrée, and dessert. Each food item can have different ingredients or serving options. In this example, a food item can be a child node of a category. The ingredients of the food item can be child nodes of the food item.

As illustrated in the above examples, hierarchical data structures can be useful for organizing data. However, navigating a hierarchical data structure in a user interface poses technological challenges. A hierarchical data structure can include relatively few nodes in the higher levels of the hierarchical data structure and vastly more nodes in the lower levels of the hierarchical data structure. Displaying the entire hierarchical data structure in a display, therefore, can be an inefficient use of the display. Further, a hierarchical data structure can describe relationships between the parent nodes and child nodes. For example, as alluded above, a network administrator can be granted permissions that depend on other permissions or inherit from other permissions. Displaying the hierarchical data structure without describing the relationship can be an ineffective display of the hierarchical data structure. For example, displaying all permissions available to a network administrator as a list or a menu can be ineffective at describing the dependencies and inheritances associated with the permissions. Further, displaying an entire hierarchical data structure in a display or displaying all nodes of the hierarchical data structure as a list or a menu is ineffective at providing contextual functions that depend on the levels of the hierarchical data structure.

Accordingly, disclosed are methods and systems for providing a column browser for navigating hierarchical data structures. The column browser can include multiple columns for displaying different levels of the hierarchical data structure and the information, options, and other data stored in nodes of the different levels. The column browser can navigate to different levels of the hierarchical data structure by traversing through parent node and child node links in the hierarchical data structure. Based on the links, the column browser can navigate up or down levels of the hierarchical data structure. The column browser can also facilitate various uses with the hierarchical data structure by providing for selecting, modifying, and other interactions with the data in the hierarchical data structure. The column browser can also provide contextual functions, such as search functions, associated with the levels or nodes of the hierarchical data structure. The column browser can also provide an overview that displays a listing of interactions such as modifications made or options selected in the hierarchical data structure. Using a column browser provides for improved efficiency and effectiveness in navigating and interacting with a hierarchical data structure, as further described herein.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120. This diagram illustrates an example where a hierarchical data structure may be used to describe the network configuration 100.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on. In a hierarchical data structure, the access controls can be described, for example, with an administrator with full access controls as a parent node, and authorized users with various levels of access controls as child nodes In the illustrated example, the primary site 102 includes a controller 104 in communication with the network 120. The controller 104 may provide communication with the network 120 for the primary site 102. The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120. Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless. Wireless APs 106a-c are included as another example of a point of access to the network established in primary site 102 for client devices 110a-h. In the illustrated example, APs 106a-c can be managed and configured by the controller 104. APs 106a-c communicate with the controller 104 and the network over connections 112, which may be either wired or wireless interfaces. In a hierarchical data structure, the connections between the client devices 110a-h, the APs 106a-c, the switch 108, and the controller 104 can be described, for example, with the controller 104 as a parent node, the switch 108 and the APs 106a-c as child nodes to the parent node (controller 104), and the client devices 110a-h as child nodes to their respective parent nodes (the switch 108 and the APs 106a-c).

The network configuration 100 may include one or more remote sites 132. A remote site 132 may be in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor, or suite in a building, and so on. The remote site 132 may include a gateway device 134 for communicating with the network 120. The remote site 132 may also include a switch 138 and/or AP 136 in communication with the gateway device 134 over either wired or wireless connections. The switch 138 and AP 136 provide connectivity to the network for various client devices 140a-d.

In some cases, the remote site 132 may be in direct communication with primary site 102, such that client devices 140a-d at the remote site 132 access the network resources at the primary site 102 as if these clients' devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

The network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network configuration 100 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a j, 140a-d, 150a-b may request and access the multimedia content provided by the content servers 160a-b.

In a hierarchical data structure, the network configuration 100 can be described, for example, with the control 104 as a root node of the hierarchical data structure. The primary site 102 and remote sites 132, 142 can be child nodes to the root node. Content servers 160a-b can also be child nodes to the root node. The switch 108 and the APs 106a-c can be child nodes to the node for primary site 102. Client devices 110a-c can be child nodes to the node for AP 106b. Client devices 110d-f can be child nodes to the node for AP 106c. Client devices 110g-h can be child nodes to the node for AP 106a. Client devices 110i,j can be child nodes to the node for switch 108. The gateway device 134 can be a child node to the node for remote site 132. The switch 138 and AP 136 can be child nodes to the node for the gateway device 134. Client devices 140a-b can be child nodes to the node for the switch 138. Client devices 140c-d can be child nodes to the node for the AP 136. The gateway device 144 can be a child node to the node for remote site 142. AP 146 can be a child node to the node for the gateway device 144. Client devices 150a-b can be child nodes to the node for AP 146. Many variations are possible.

Although only ten client devices 110a-j are illustrated at primary site 102 in the example of FIG. 1, in various applications, a network may include dramatically larger quantities of client devices. For example, various wireless networks may include hundreds, thousands, or even tens of thousands of client devices communicating with their respective APs, potentially at the same time. Thus, as illustrated in the example of FIG. 1, a hierarchical data structure describing a network configuration can grow dramatically complex. Further, network administration is another example in which information, such as permissions and scope, is organized in a hierarchical data structure. Different network administrators of a network can have different permissions and scopes commensurate with their roles in the network. These different permissions and scopes can have dependencies and inherencies that can be described in a hierarchical data structure. In combination with the complexities of a network, such as the network configuration 100, the hierarchical data structure that describes the different permissions and scopes of the different network administrators of the network can also be dramatically complex.

Figure 2:
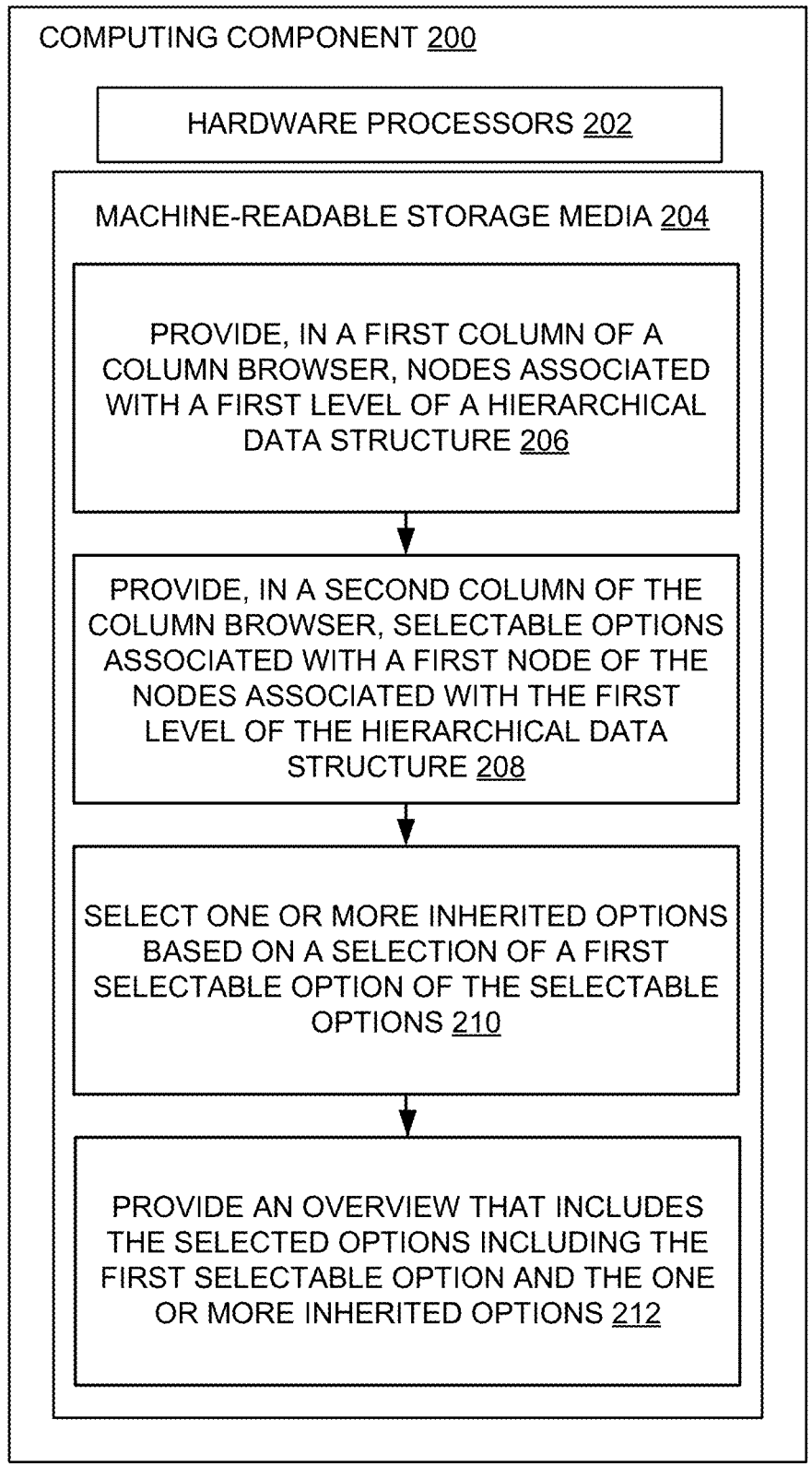
FIG. 2 illustrates an example computing component for navigating a hierarchical data structure using a column browser.

FIG. 2 is a block diagram of an example computing component or device 200 for providing a column browser for navigating a hierarchical data structure in accordance with various embodiments. Computing component 200 may be, for example, a server computer, a client device, a controller, or any other similar computing component capable of processing data. In some cases, a column browser can be provided, for example, as an overlay to a website, a web page, an application interface, or an interface associated with a hierarchical data structure. In some cases, a column browser can be provided as an application. Many variations are possible. In the example implementation of FIG. 2, the computing component 200 includes a hardware processor 202 and machine-readable storage medium 204.

Hardware processor 202 may be one or more central processing units (CPUs), semiconductor-based microprocessors, and/or other hardware devices suitable for retrieval and execution of instructions stored in machine-readable storage medium 204. Hardware processor 202 may fetch, decode, and execute instructions, such as instructions 206-212, to control processes or operations for providing a column browser for navigating a hierarchical data structure. As an alternative or in addition to retrieving and executing instructions, hardware processor 202 may include one or more electronic circuits that include electronic components for performing the functionality of one or more instructions, such as a field programmable gate array (FPGA), application specific integrated circuit (ASIC), or other electronic circuits. Instructions 206-212 can allow for providing a column browser. Although instructions 206-212 are shown, it can be understood that the instructions can be performed in any order, without some of the instructions shown, and/or with the inclusion of other instructions not shown, and the instructions would still fall within the scope of the disclosure.

A machine-readable storage medium, such as machine-readable storage medium 204, may be any electronic, magnetic, optical, or other physical storage device that contains or stores executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 204 may be a non-transitory storage medium, where the term "non-transitory" does not encompass transitory propagating signals. As described in detail below, machine-readable storage medium 204 may be encoded with executable instructions, for example, instructions 206-212, for providing a column browser for navigating a hierarchical data structure.

Hardware processor 200 may execute instruction 206 to provide, in a first column of a column browser, nodes associated with a first level of a hierarchical data structure. As described herein, a hierarchical data structure can include multiple levels, and each level can include one or more nodes. The nodes are, in some cases, connected to a respective parent node in a level above the nodes and, in some cases, connected to child nodes in a level below the nodes. In some cases, the column browser can include links to traverse to higher levels of the hierarchical data structure and links to traverse to lower levels of the hierarchical data structure. The links may be included outside the columns of the column browser. As an example, a column browser can navigate a hierarchical data structure from a root node, which is the node at the topmost level of a hierarchical data structure. The first column of the column browser can provide the root node of the hierarchical data structure. The column browser can navigate to a lower level of the hierarchical data structure by, for example, traversing to a child node of the root node. The first column of the column browser can be updated to provide the child nodes of the root node to indicate that the column browser has navigated to a level of the hierarchical data structure associated with the child nodes of the root node. From this level of the hierarchical data structure, the column browser can navigate back to the root node and the first column of the column browser can be updated to provide the root node. The column browser can also navigate to another lower level of the hierarchical data structure by, for example, traversing to a child node of one of the child nodes of the root node. The first column of the column browser can be updated to provide the child nodes of the child node to which the column browser navigated to indicate that the column browser has navigated to another lower level of the hierarchical data structure.

A node in the first column of the column browser can be provided along with an icon or other indicator to indicate that the node includes information. The information can be provided based on an interaction with the icon or the node. In some cases, the information can be provided in a second column of the column browser. For example, a node that includes selectable data can be provided along with an arrow icon to indicate that the node includes selectable data. In this example, the selectable data can be provided in a second column of the column browser, based on an interaction with the node or the arrow icon. In some cases, a node in the first column of the column browser can be provided along with an indication of a number of child nodes that relate to the node. Nodes that do not have child nodes, such as leaf nodes, can be provided without the indication of a number of child nodes.

Hardware processor 200 may execute instruction 208 to provide, in a second column of the column browser, selectable options associated with a first node of the nodes associated with the first level of the hierarchical data structure. The second column of the column browser can provide information based on an interaction with a node in a first column of the column browser, such as the first column described above. The information can include, for example, information corresponding to the interacted node, such as data stored in the interacted node. The information can also include, for example, selectable options, such as permissions associated with the interacted node. The second column of the column browser can also provide child nodes of the interacted node and links to the child nodes of the interacted node. The column browser can navigate to lower levels of the hierarchical data structure based on the links to the child nodes of the interacted node. The column browser can update the first column of the column browser with the child nodes of the interacted node. Based on an interaction with one of the child nodes of the interacted node in the first column, the second column of the column browser can provide information, such as selectable options, for the interacted node.

In some cases, the second column of the column browser can provide functions based on a level of a hierarchical data structure associated with an interacted node. The functions can include, for example, a search function. The search function can search for a search term within an interacted node. In some cases, the search function can more broadly search for the search term within nodes at the level of the interacted node. In some cases, the search function can more broadly search for the search term within nodes at the level of the interacted node and at lower levels of the interacted node. A search function can search nodes. For example, a column browser can navigate to from a root node of a hierarchical data structure to a first level of the hierarchical data structure and, subsequently, to a second level of the hierarchical data structure. In this example, a search for a search term while the column browser has navigated to the second level of the hierarchical data structure can return results for the search term from nodes at the second level of the hierarchical data structure and from nodes at lower levels (e.g., a third level, a fourth level, etc.) of the hierarchical data structure. The functions can also include, for example, a filter function. The filter function in the second column of a column browser can filter information associated with an interacted node based on filter criteria. The information associated with the interacted node that does not satisfy the filter criteria can be hidden or otherwise prevented from being provided.

As described herein, a column browser can navigate a hierarchical data structure based on interactions with links provided in the column browser. As the column browser navigates the hierarchical data structure, nodes and information in the columns of the column browser can update based on a level of the hierarchical data structure to which the column browser has navigated and interactions with provided in the column browser. For example, a column browser for navigating a hierarchical data structure can include two columns. A first column in the column browser can display nodes of a level of a hierarchical data structure. A second column in the column browser can display options associated with a selected node in the left column. In this example, the column browser can begin navigating the hierarchical data structure from the top level of the hierarchical data structure. In the first column, the column browser can display the root node, which can be, for example, all resources associated with the hierarchical data structure. In the second column, the column browser can display child nodes of the root node, which can be, for example, categories for the resources associated with the hierarchical data structure. The column browser can navigate the hierarchical data structure based on links provided in the column browser. In this example, the child nodes of the root node displayed in the second column can serve as links to a lower level of the hierarchical data structure. Based on an interaction with one of the child nodes, the first column of the column browser can be updated with the child nodes of the root node, indicating that the column browser has navigated to the lower level of the hierarchical data structure. Based on an interaction with one of the child nodes in the first column, the second column can be updated with options associated with the selected node. A link can be provided in the column browser to navigate to a higher level. Based on an interaction with the link, the first column can be updated with the root node, indicating that the column browser has navigated to the top level of the hierarchical data structure. Based on an interaction with the root node, the second column can be updated with the child nodes of the root node, which can serve as links to the lower level of the hierarchical data structure.

Hardware processor 200 may execute instruction 210 to select one or more inherited options based on a selection of a first selectable option of the selectable options. In a hierarchical data structure, a relation between a parent node and a child node can indicate a dependency or an inherency. For example, a permission to read and write to a category of resources inherently includes permissions to read and write to resources in subcategories of the category as these permissions are inherent to the permission to read and write to the category of resources. Blocking the permission to read and write to the category of resources would prevent the permissions to read and write to resources in subcategories of the category as these permissions depend on the permission to read and write to the category to not be blocked. When an option is selected in a column browser, options that depend on or inherit from the selected option can be automatically selected or, in some cases, deselected. In some cases, options can be mutually exclusive. For example, a permission to read and write to a category of resources can be mutually exclusive from a permission to block access to the category of resources as reading and writing cannot be performed if access to the category of resources is blocked. The column browser can automatically deselect options that are mutually exclusive from a selected option. As an example, a column browser can navigate a hierarchical data structure that describes permissions associated with a network. The column browser can select an option to enable a permission at one level of the hierarchical data structure. In this example, the permission can include inherent permissions at lower levels of the hierarchical data structure that are inherent to the permission. The inherent permissions at the lower levels can be automatically selected based on the selection of the option to enable the permission. To illustrate, a column browser can navigate a hierarchical data structure that describes grocery items available for sale. The column browser can select an option to purchase, for example, chips. In this example, chips can be a category that includes various styles of chips. Based on the selection of the option to purchase chips, options to purchase the various styles of chips can be automatically selected.

Hardware processor 200 may execute instruction 212 to provide an overview that includes the selected options including the first selectable option and the one or more inherited options. As a column browser navigates a hierarchical data structure, various selections or interactions can be made at different levels of the hierarchical data structure. The overview can provide a list or summary of the various selections or interactions that were made. The overview can provide for options associated with the list or summary of the various selections or interactions that were made. The options can include, for example, an option to navigate to a node corresponding to a selection or interaction and an option to remove a selection or interaction. For example, a column browser can navigate a hierarchical data structure describing permissions associated with a network. The column browser can navigate to different levels of the hierarchical data structure and select different permissions at the different levels. The column browser can provide an overview that provides a list of the selected permissions. In some cases, the selected permissions can be unselected from the overview. By providing an overview, the column browser can provide an effective display of selected options from different levels of a hierarchical data structure.

FIGS. 3A-3E illustrate example interfaces associated with navigating a hierarchical data structure in accordance with various embodiments. The example interfaces can be associated with one or more functionalities performed by, for example, the example computing component 200 of FIG. 2. It should be understood that there can be additional, fewer, or alternative steps performed in similar or alternative orders, or in parallel, based on the various features and embodiments discussed herein unless otherwise stated.

Figure 3A:
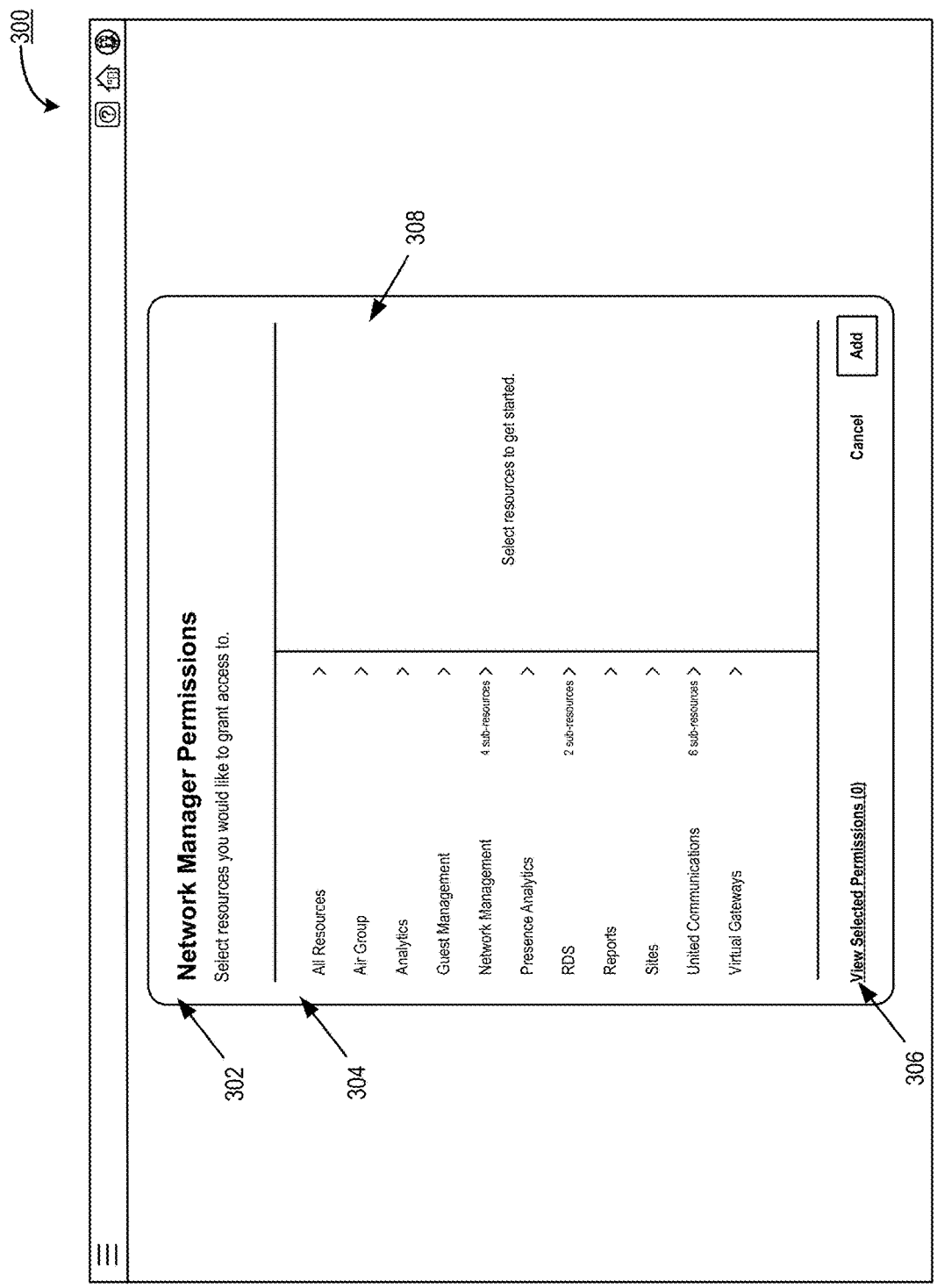
FIG. 3A-3E illustrate example interfaces associated with navigating a hierarchical data structure.

FIG. 3A illustrates an example interface 300 in accordance with various embodiments. The example interface 300 displays a column browser 302 associated with navigating a hierarchical data structure of network manager permissions. As illustrated in this example, the column browser 302 includes a first column 304 that includes a root node (e.g., "All Resources") and example nodes of a first level of the hierarchical data structure (e.g., "Air Group," "Analytics," "Guest Management," "Network Management," "Presence Analytics," "RDS," "Reports," "Sites," "United Communications," "Virtual Gateways"). The first column 304 also includes arrow icons associated with the root node and the nodes of the first level. In this example, the arrow icons indicate that the root node and the nodes of the first level are associated with selectable options. The first column 304 also includes an indication of a number of child nodes that relate to the nodes of the first level. In this example, the node for "Network Management" relates to four child nodes, the node for "RDS" relates to two child nodes, and the node for "United Communications" relates to six child nodes. As illustrated in this example, the column browser 302 includes a second column 308. The second column 308 can be updated with selectable options or other information based on an interaction with a node in the first column 304. The column browser 302 includes an overview link 306 to an overview of selected options in the hierarchical data structure.

Figure 3B:
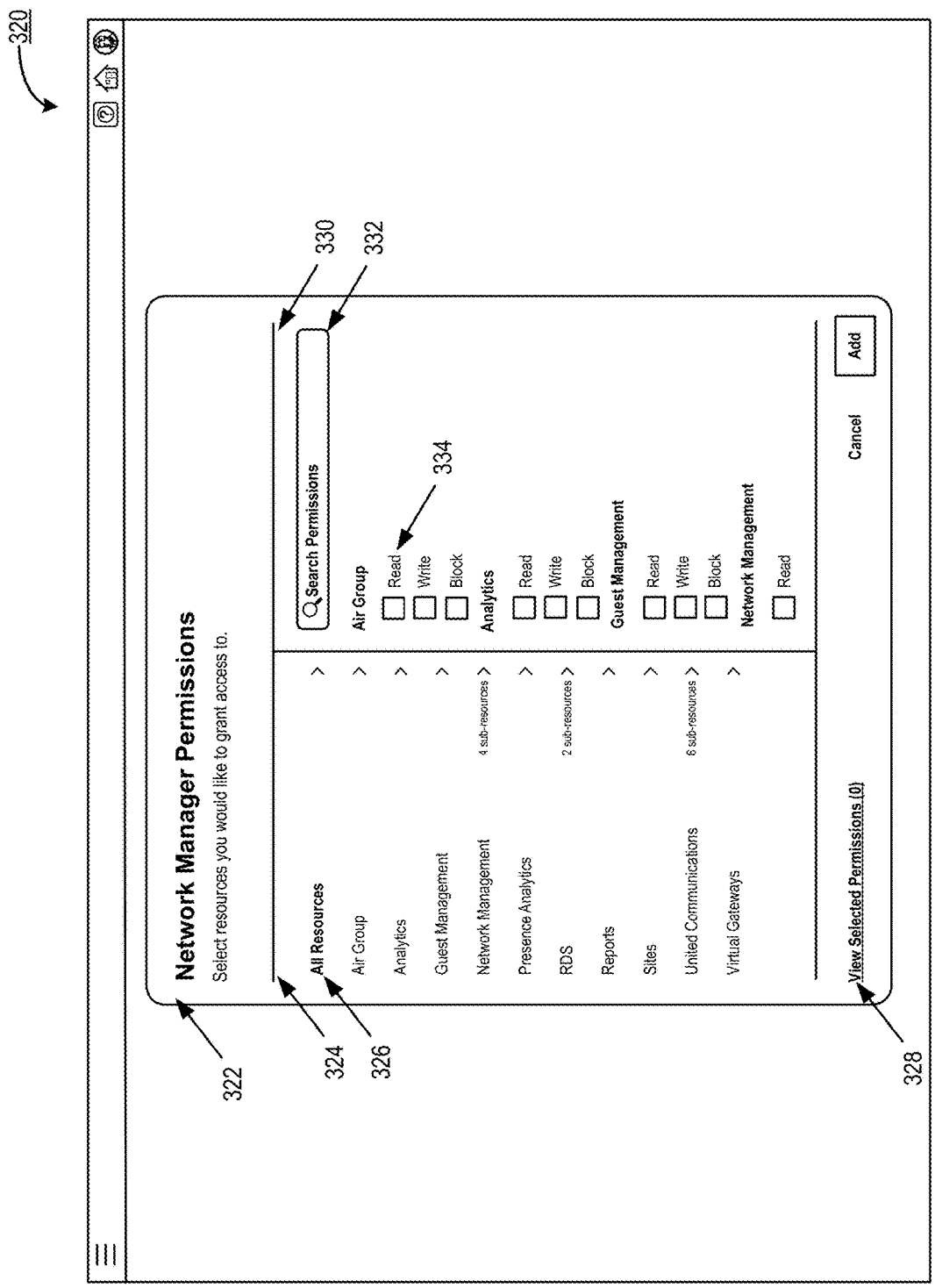

FIG. 3B illustrates an example interface 320 in accordance with various embodiments. The example interface 320 displays a column browser 322 associated with navigating a hierarchical data structure of network manager permissions. The column browser 322 can be displayed, for example, in response to an interaction with a node in the first column 304 of the column browser 302 of FIG. 3A. As illustrated in this example, the column browser 322 includes a first column 324 that includes a root node 326 and nodes of a first level of a hierarchical data structure. In this example, the root node 326 has been selected. As illustrated in this example, the column browser includes a second column 330. Based on the selection of the root node 326, the second column 330 includes a search field 332 associated with a search function to search the root node 326. The second column 330 also includes the child nodes of the root node and selectable options 334 associated with the child nodes. The column browser 322 includes an overview link 328 to an overview of selected options in the hierarchical data structure.

Figure 3C:
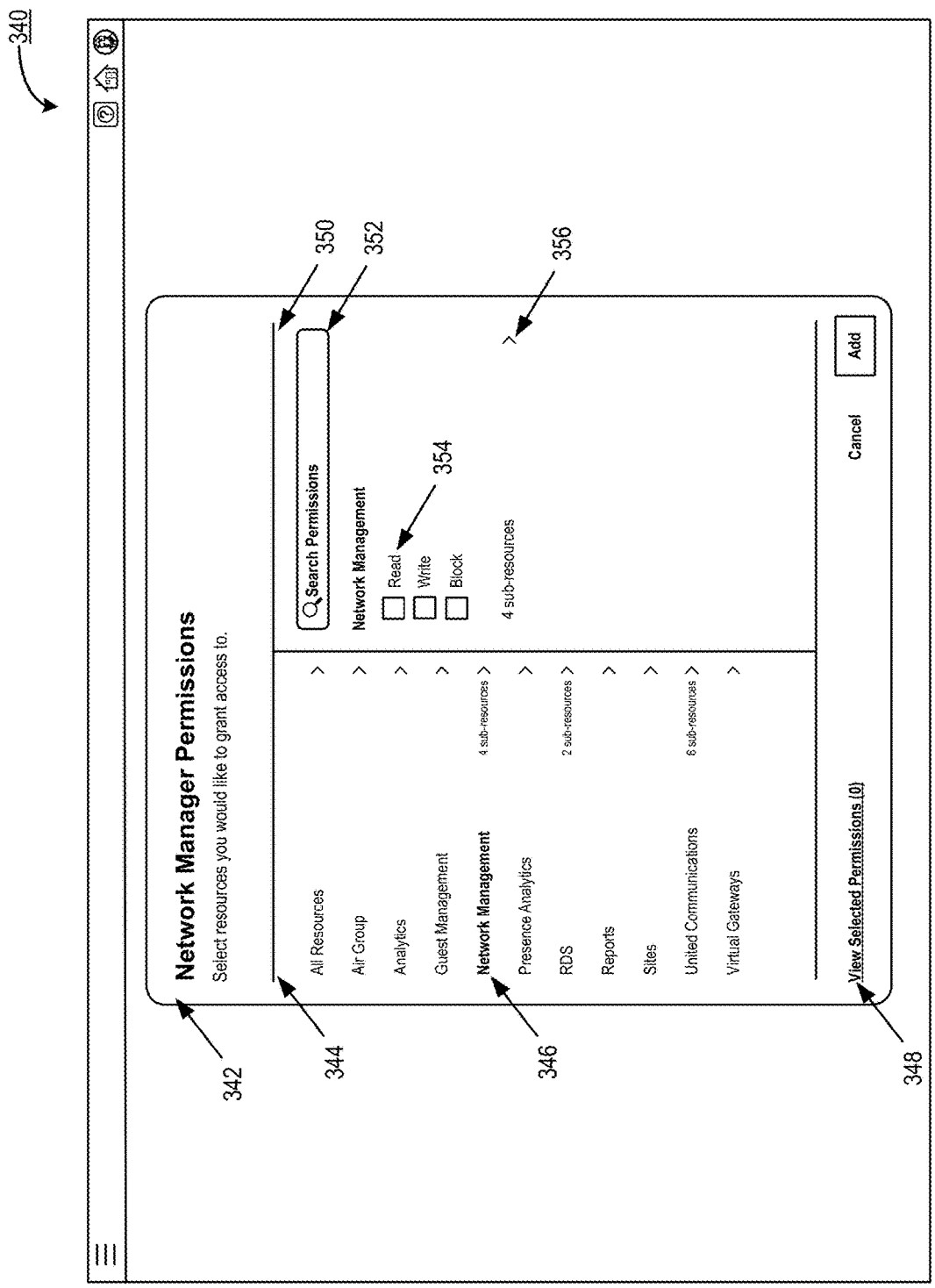

FIG. 3C illustrates an example interface 340 in accordance with various embodiments. The example interface 340 displays a column browser 342 associated with navigating a hierarchical data structure of network manager permissions. The column browser 342 can be displayed, for example, in response to an interaction with a node in the first column 324 of the column browser 322 of FIG. 3B. As illustrated in this example, the column browser 342 includes a first column 344 that includes a root node and nodes of a first level of a hierarchical data structure. The nodes of the first level include a "Network Management" node 346. In this example, the "Network Management" node 346 has been selected. As illustrated in this example, the column browser includes a second column 350. Based on the selection of the "Network Management" node 346, the second column 350 includes a search field 352 associated with a search function to search the "Network Management" node 346. The second column 350 also includes a count of a number of child nodes of the "Network Management" node 346 (e.g., 4) and selectable options 354 associated with the "Network Management" node 346. As illustrated in this example, the second column 350 includes a link 356 to the child nodes of the "Network Management" node 346. The column browser 342 includes an overview link 348 to an overview of selected options in the hierarchical data structure.

Figure 3D:
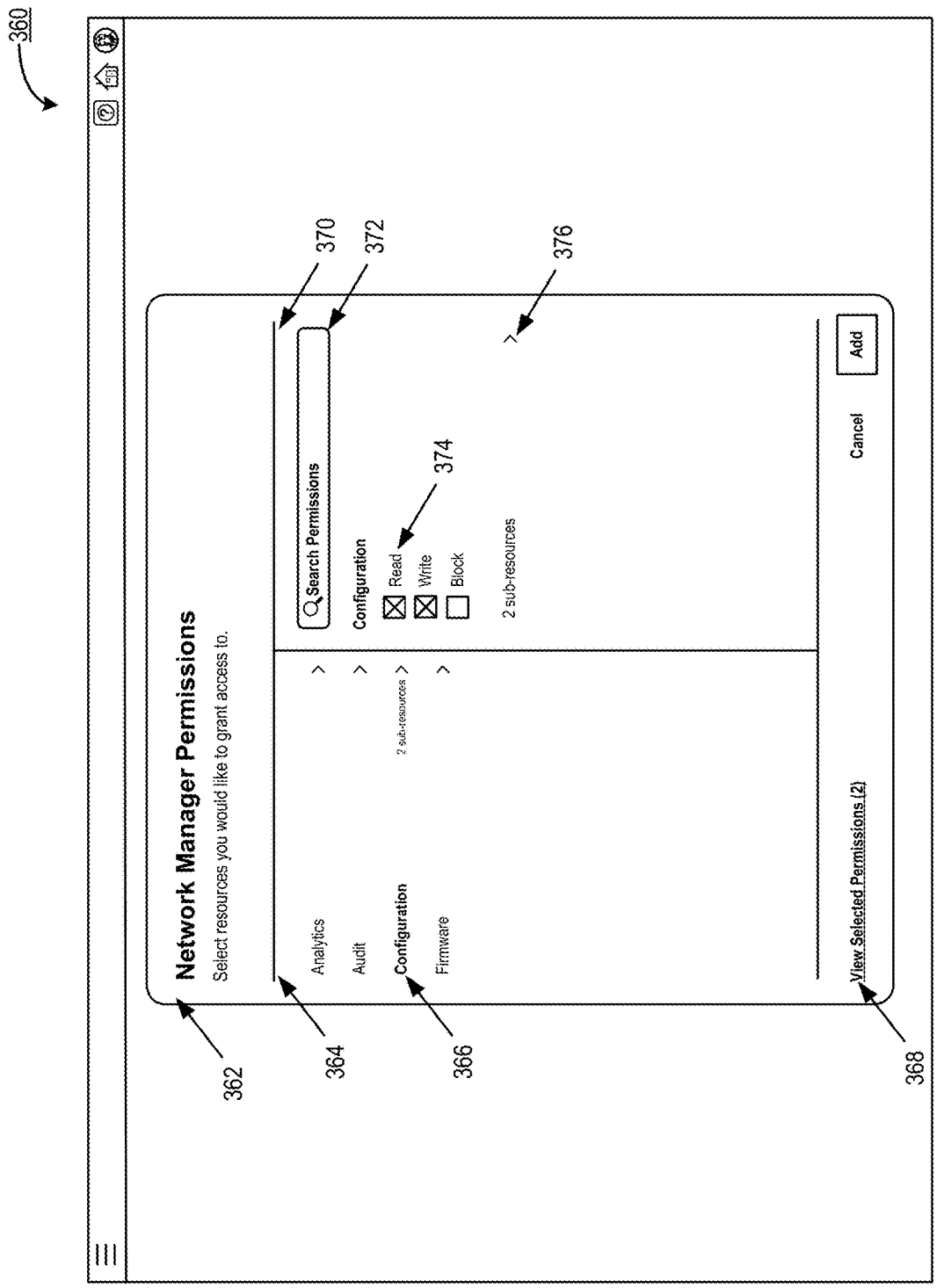

FIG. 3D illustrates an example interface 360 in accordance with various embodiments. The example interface 360 displays a column browser 362 associated with navigating a hierarchical data structure of network manager permissions. The column browser 362 can be displayed, for example, in response to an interaction with a link 356 in the second column 350 of the column browser 342 of FIG. 3C. As illustrated in this example, the column browser 362 includes a first column 364 that includes child nodes of a level of a hierarchical data structure (e.g., "Analytics," "Audit," "Configuration," "Firmware"). The nodes of this level includes a "Configuration" node 366 that has been selected. As illustrated in this example, the column browser includes a second column 370. Based on the selection of the "Configuration" node 366, the second column 370 includes a search field 372 associated with a search function to search the "Configuration" node 366. The second column 370 also includes a count of a number of child nodes of the "Configuration" node 366 (e.g., 2) and selectable options 374 associated with "Configuration" node 366. In this example, the "Read" and "Write" options have been selected. As illustrated in this example, the second column 350 includes a link 376 to the child nodes of the "Configuration" node 366. The column browser 362 includes an overview link 368 to an overview of selected options in the hierarchical data structure.

Figure 3E:
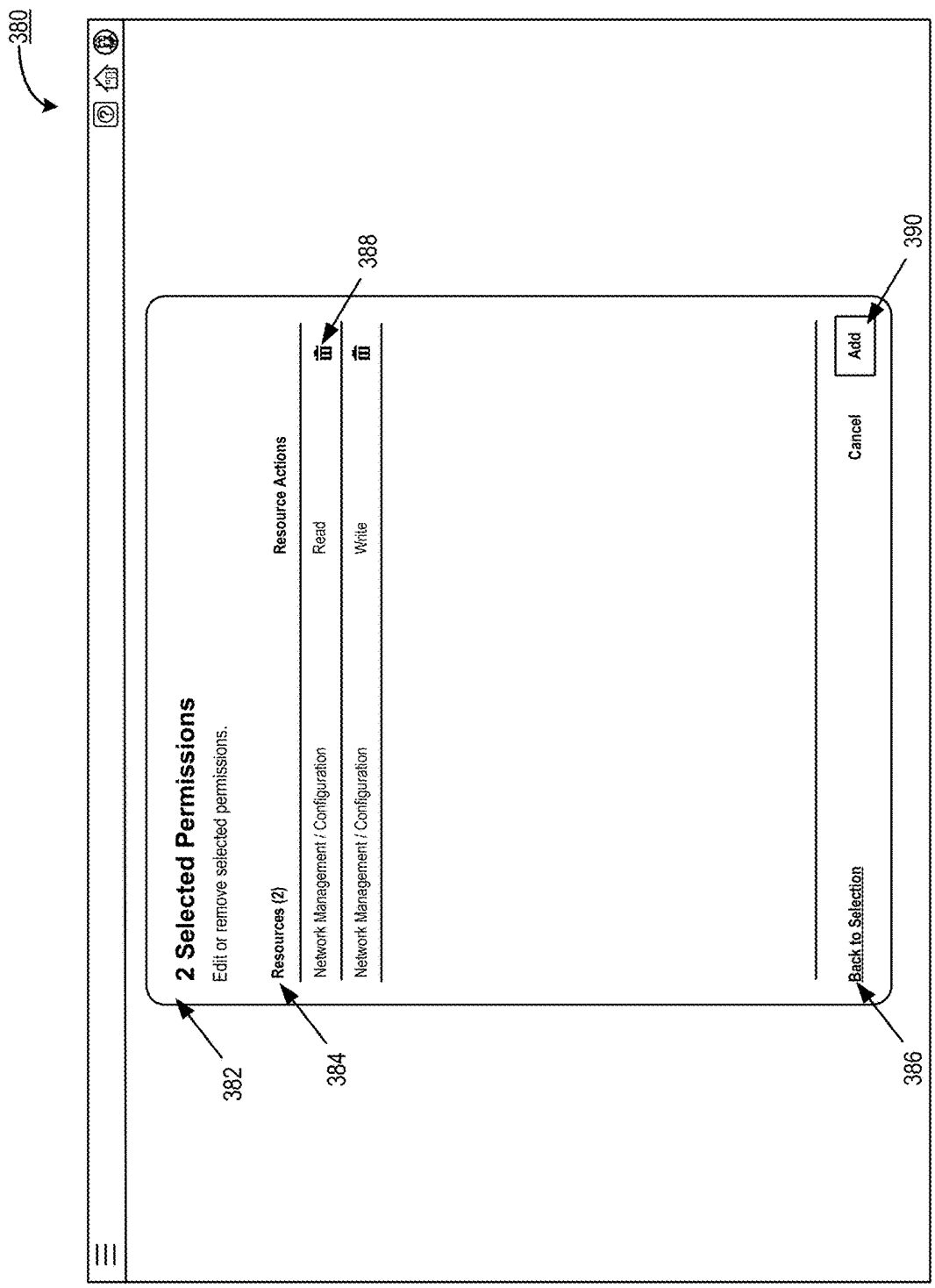

FIG. 3E illustrates an example interface 380 in accordance with various embodiments. The example interface 380 displays a column browser 382 associated with navigating a hierarchical data structure of network manager permissions. The column browser 382 can be displayed, for example, in response to an interaction with an overview link 368 of the column browser 362 of FIG. 3D. As illustrated in this example, the column browser 382 includes a list 384 of selected options. In this example, the list 384 includes the selected options "Read" and "Write" associated with the "Configuration" node, which is a child node of the "Network Management" node. As illustrated in this example, the column browser 382 includes a delete option 388 for deleting or cancelling the selection of the "Read" and "Write" options. The column browser 382 includes a return link 386 to return to a previous display of the column browser 382. The column browser 382 includes an add button 390. The add button 390, in this example, adds the selected permissions to a network manager.

Figure 4A:
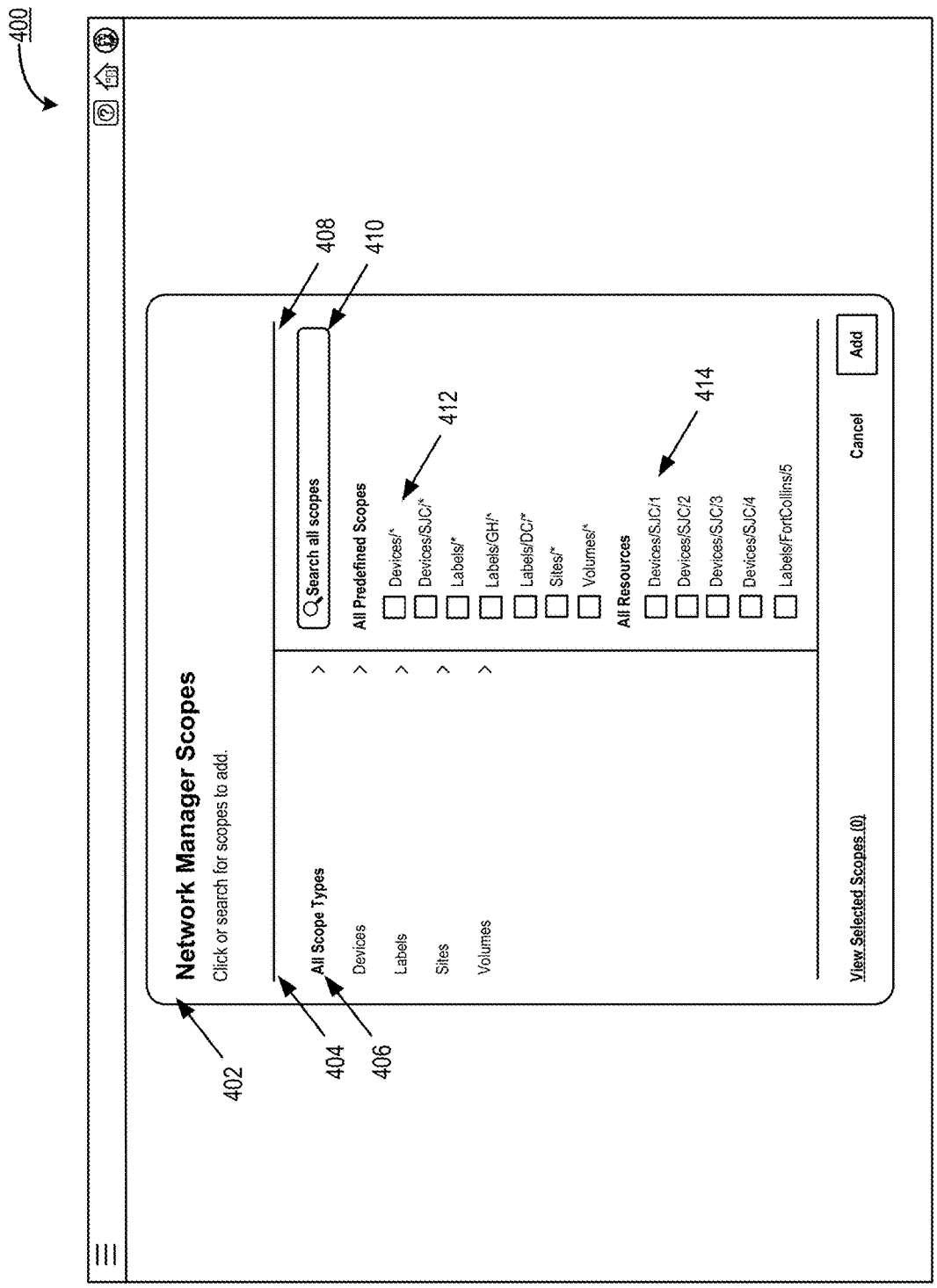
FIG. 4A-4C illustrate example interfaces associated with searching a hierarchical data structure.
Figure 4B:
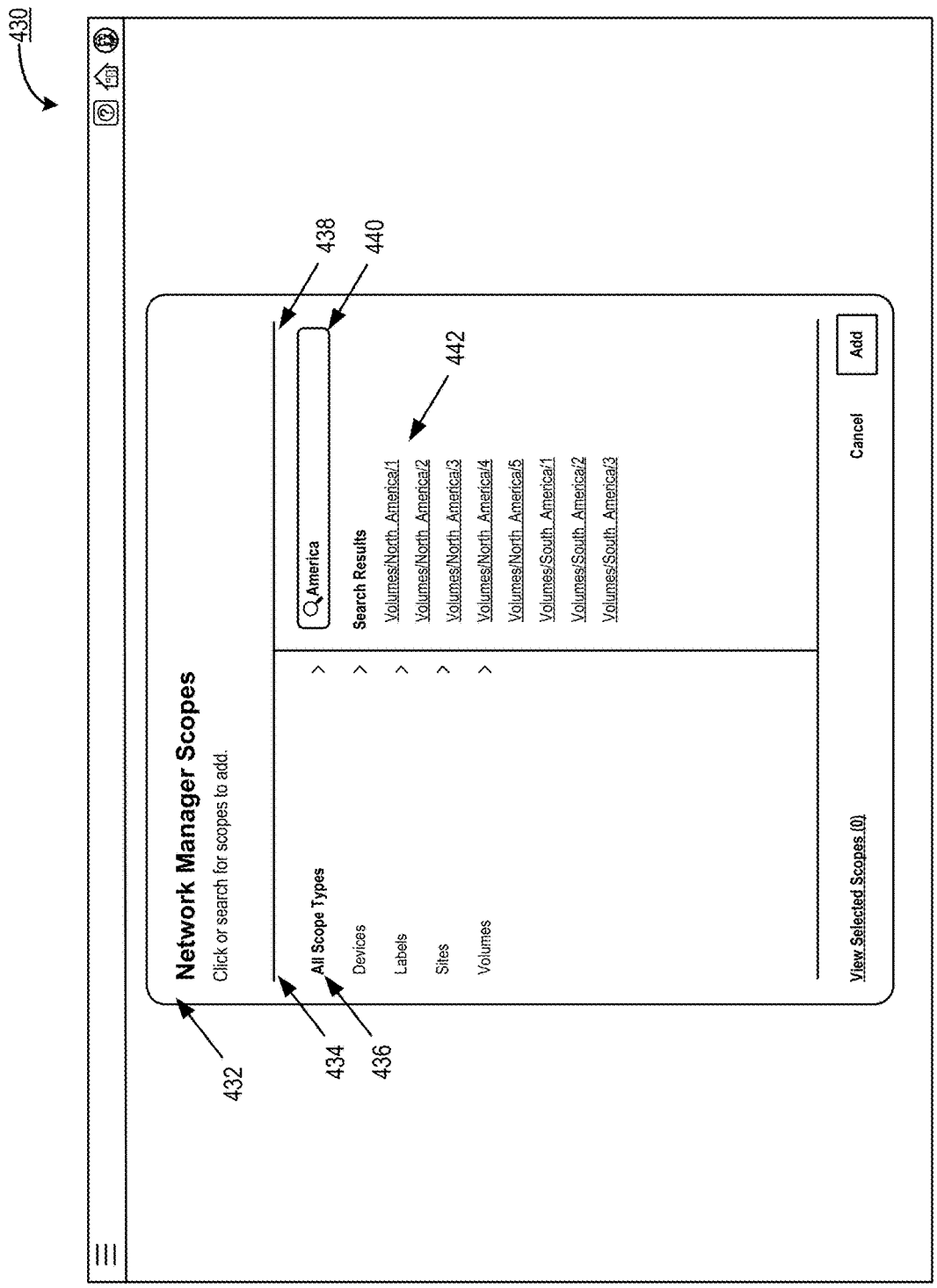
Figure 4C:
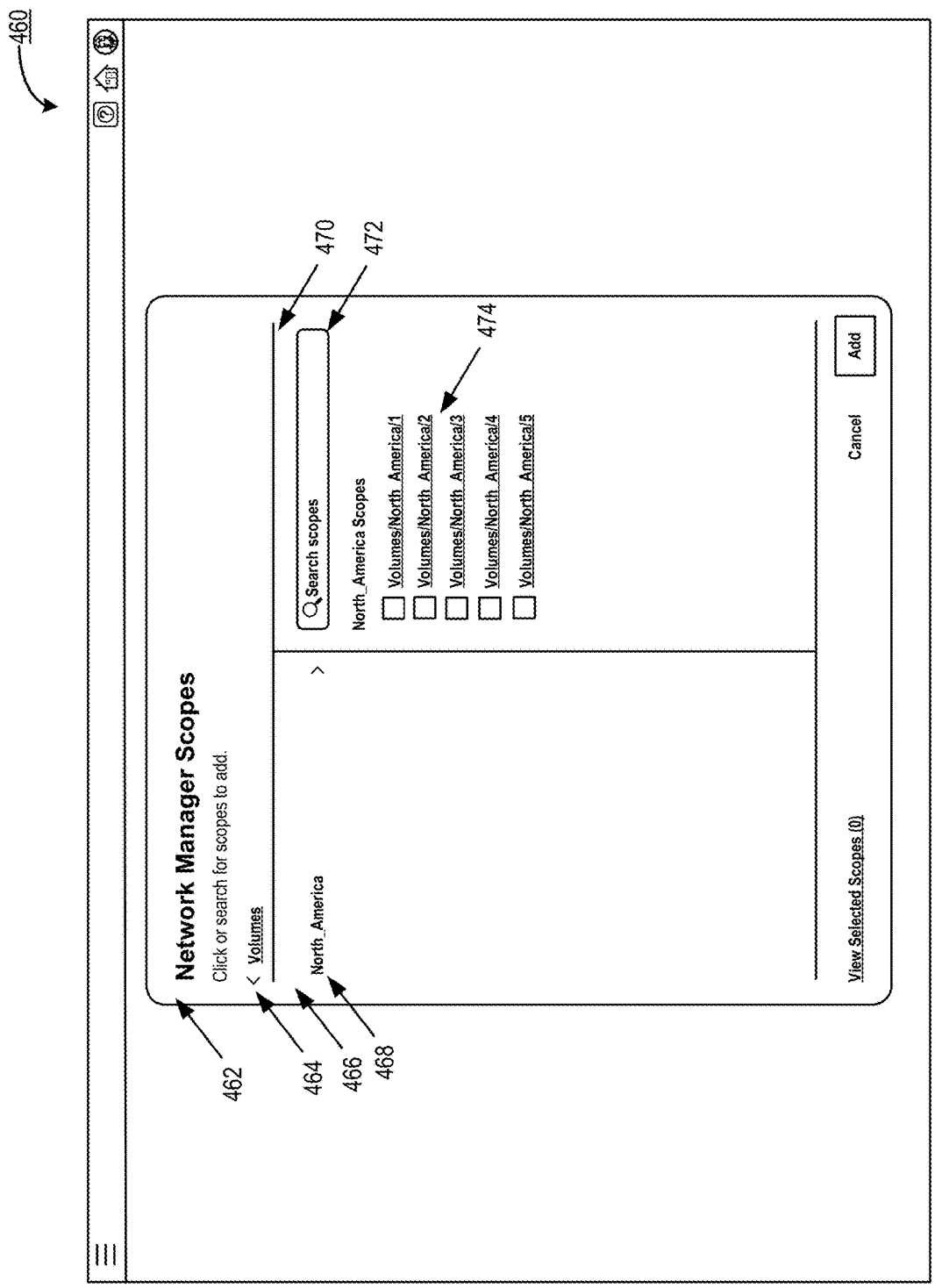

FIGS. 4A-4C illustrate example interfaces associated with searching a hierarchical data structure in accordance with various embodiments. The example interfaces can be associated with one or more functionalities performed by, for example, the example computing component 200 of FIG. 2. It should be understood that there can be additional, fewer, or alternative steps performed in similar or alternative orders, or in parallel, based on the various features and embodiments discussed herein unless otherwise stated.

FIG. 4A illustrates an example interface 400 in accordance with various embodiments. The example interface 400 displays a column browser 402 associated with navigating a hierarchical data structure of network manager scopes. As illustrated in this example, the column browser 402 includes a first column 404 that includes a root node 406 (e.g., "All Scope Types") and nodes of a first level of the hierarchical data structure (e.g., "Devices," "Labels," "Sites," "Volumes"). The first column 404 also includes arrow icons associated with the root node and the nodes of the first level. In this example, the arrow icons indicate that the root node 406 and the nodes of the first level are associated with selectable options. In this example, the root node 406 has been selected. As illustrated in this example, the column browser 402 includes a second column 408. Based on the selection of the root node 406, the second column 408 includes a search field 410 associated with a search function to search the root node 406. The second column 408 also includes predefined searches 412, which can include, for example, common search terms. The second column 408 also includes a listing of resources 414 available under the root node.

FIG. 4B illustrates an example interface 430 in accordance with various embodiments. The example interface 430 displays a column browser 432 associated with navigating a hierarchical data structure of network manager scopes. The column browser 432 can be displayed, for example, in response to a search for "America" in the search field 410 in the second column 408 of the column browser 402 of FIG. 4A. As illustrated in this example, the column browser 432 includes a first column 434 that includes a root node 436 and nodes of a first level of the hierarchical data structure. In this example, the root node 436 has been selected. As illustrated in this example, the column browser 432 includes a second column 438. Based on the selection of the root node 436, the second column 438 includes a search field 440 associated with a search function to search the root node 436. The second column 438 also includes search results 442 for the search term "America." As illustrated in this example, the search results 442 can be links to respective nodes of the search results 442.

FIG. 4C illustrates an example interface 460 in accordance with various embodiments. The example interface 460 displays a column browser 462 associated with navigating a hierarchical data structure of network manager scopes. The column browser 462 can be displayed, for example, in response to an interaction with search results 442 of the column browser 432 of FIG. 4B. As illustrated in this example, the column browser 462 includes a first column 466 that includes a leaf node 468 of a level of the hierarchical data structure. The column browser 462 includes a return link 464 that allows the column browser 462 to navigate to a higher level of the hierarchical data structure. As illustrated in this example, the column browser 462 includes a second column 470. The second column 470 includes a search field 472 associated with a search function to search the leaf node 468. The second column 470 also includes selectable options 474 associated with the leaf node 468.

While various examples in the present disclosure describe using a column browser to navigate a hierarchical data structure of network permissions and network scopes, it should be understood that the present disclosure can be applied to other use cases as well. For example, a column browser can navigate a hierarchical data structure of user roles in a role management use case. The column browser can also navigate a hierarchical data structure of regions, locations, resources, or people, such as in an organization chart. It should be understood that many variations are possible.

Figure 5:
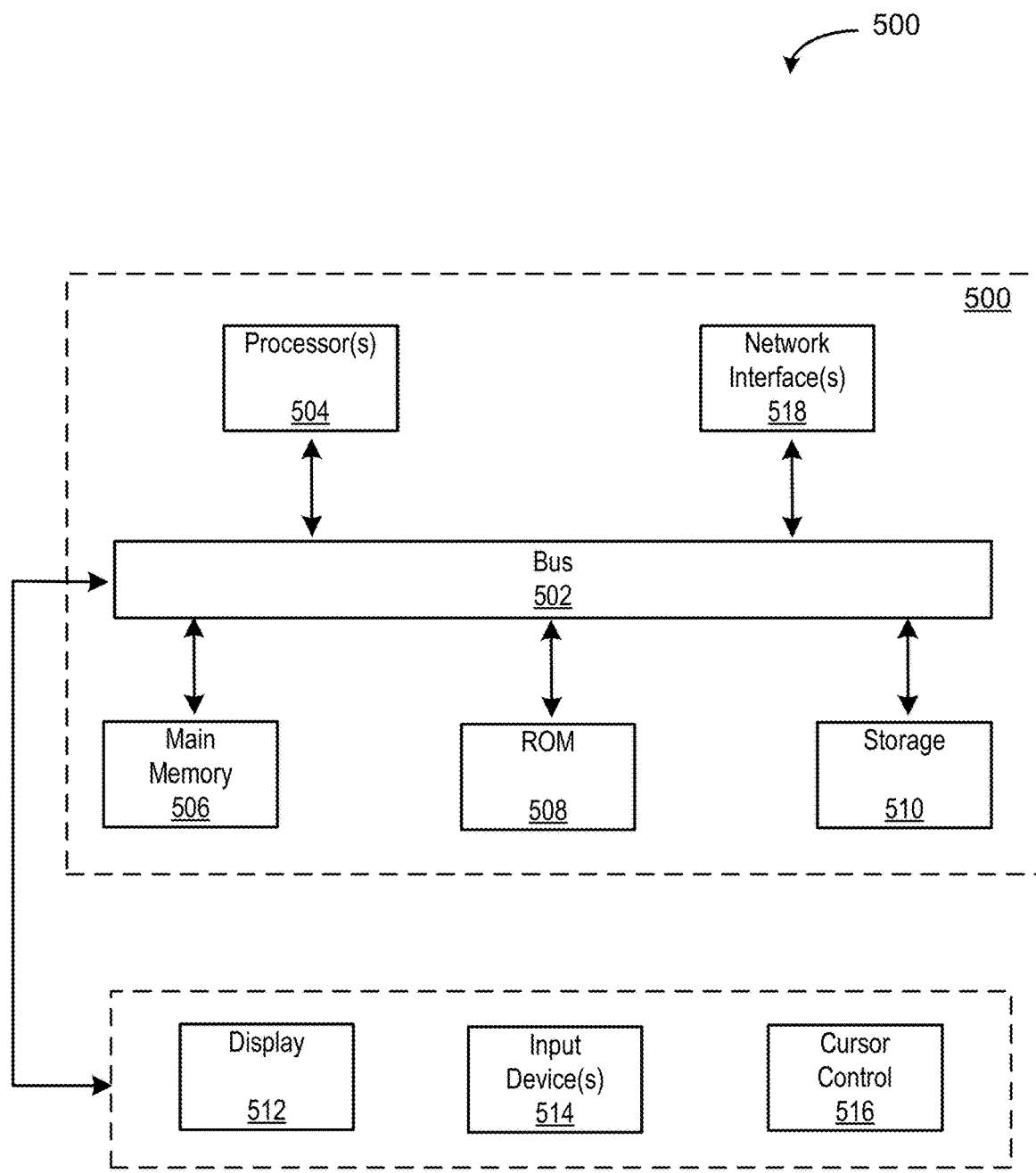
FIG. 5 is an example computing component that may be used to implement various features of embodiments described in the present disclosure.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
    analyzing a hierarchical data structure by determining one or more nodes interconnected in the hierarchical data structure;
    creating a list of the nodes of the hierarchical data structure, wherein the list of the nodes comprises a plurality of levels and each of the levels indicates a connection relationship between the nodes in the hierarchical data structure;
    displaying the list of the nodes in a column browser by providing, in a first column of the column browser, first level nodes associated with a first level of the hierarchical data structure;
    providing, in a second column of the column browser, selectable options of interactions with a first node of the first level nodes associated with the first level of the hierarchical data structure;
    automatically selecting, in response to a selection of a first selectable option of the selectable options of interactions with the first node of the first level nodes provided in the second column, one or more inherited options of interactions with one or more child nodes of the first node of the hierarchical data structure;
    providing an overview comprising a summary of selected options including the first selectable option and the selected one or more inherited options of interactions with the one or more child nodes of the first node of the hierarchical data structure,
    providing, in the second column, a search field;
    searching, in response to a search term being at least partially entered into the search field, for the search term in the first level of the hierarchical data structure and in one or more levels below the first level of the hierarchical data structure; and
    providing, while continuing to provide in the first column of the column browser the first level nodes associated with the first level of the hierarchical data structure, search results for the search term in the second column of the column browser, wherein the search results include links to nodes associated with the search results.

2. The method of claim 1, further comprising:
    deselecting one or more mutually exclusive options based on a selection of a second selectable option of the selectable options.

3. The method of claim 1, wherein the overview further comprises links to nodes associated with the selected options.

4. The method of claim 1, wherein the overview further comprises an option to deselect one or more of the inherited options.

5. The method of claim 1, further comprising:
    providing, in the second column of the column browser, one or more child nodes of the first node and one or more links to the one or more child nodes; and
    providing, in the first column of the column browser, the one or more child nodes of the first node based on an interaction with the one or more links to the one or more child nodes.

6. The method of claim 1, further comprising:
    updating, in the column browser, the list of the nodes present in the hierarchical data structure, wherein updating comprises:
        adding, in the column browser, one or more new nodes to the list of the nodes of the hierarchical data structure, wherein the new nodes are recently interconnected to the hierarchical data structure; and
        removing, in the column browser, one or more disconnected nodes from the list of the nodes of the hierarchical data structure, wherein the disconnected nodes are recently disconnected from the hierarchical data structure.

7. The method of claim 6, wherein the inherited options comprise one or more permissions associated with the first selectable option.

8. The method of claim 1, further comprising:
    providing, in the second column, an indication of a number of child nodes of the first node from the first column and a link to the one or more child nodes of the first node;
    replacing, based on an interaction with the link to the one or more child nodes in the second column, in the first column the first level nodes associated with the first level of the hierarchical data structure with the one or more child nodes of the first node; and
    providing, in the second column of the column browser based on a selection of a first child node of the one or more child nodes of the first node provided in the first column, selectable options of interactions with the first child node of the one or more child nodes of the first node provided in the first column.

9. A system, comprising:
    a processor; and a memory operatively connected to the processor, and including computer code that when executed, causes the system to:
- analyze a hierarchical data structure by determining one or more nodes interconnected in the hierarchical data structure;
- create a list of the nodes of the hierarchical data structure, wherein the list of the nodes comprises a plurality of levels and each of the levels indicates a connection relationship between the nodes in the hierarchical data structure;
- display the list of the nodes in a column browser by providing, in a first column of the column browser, first level nodes associated with a first level of the hierarchical data structure;
- provide, in a second column of the column browser, selectable options of interactions with a first node of the first level nodes associated with the first level of the hierarchical data structure;
- automatically select, in response to a selection of a first selectable option of the selectable options of interactions with the first node of the first level nodes provided in the second column, one or more inherited options of interactions with one or more child nodes of the first node of the hierarchical data structure;
- provide an overview comprising a summary of selected options including the first selectable option and the selected one or more inherited options of interactions with the one or more child nodes of the first node of the hierarchical data structure:
- provide, in the second column, a search field;
- search, in response to a search term being at least partially entered into the search field, for the search term in the first level of the hierarchical data structure and in one or more levels below the first level of the hierarchical data structure; and
- provide, while continuing to provide in the first column of the column browser the first level nodes associated with the first level of the hierarchical data structure, search results for the search term in the second column of the column browser, wherein the search results include links to nodes associated with the search results.

10. The system of claim 9 wherein the computer code further causes the system to:
deselect one or more mutually exclusive options based on a selection of a second selectable option of the selectable options.

11. The system of claim 9, wherein the selected options in the overview further comprises links to nodes associated with the selected options.

12. The system of claim 9, wherein the overview further comprises an option to deselect one or more of the inherited options.

13. The system of claim 9, wherein the computer code further causes the system to:
- provide, in the second column of the column browser, one or more child nodes of the first node and one or more links to the one or more child nodes; and
- provide, in the first column of the column browser, the one or more child nodes of the first node based on an interaction with the one or more links to the one or more child nodes.

14. The system of claim 9, wherein the computer code further causes the system to:
- provide, in the column browser, a link to a parent node of the first node; and
- provide, in the first column of the column browser, the parent node based on an interaction with the link to the parent node.

15. A non-transitory computer-readable storage medium including instructions that, when executed by at least one processor of a computing system, cause the computing system to:
- analyze a hierarchical data structure by determining one or more nodes interconnected in the hierarchical data structure;
- create a list of the nodes of the hierarchical data structure, wherein the list of the nodes comprises a plurality of levels and each of the levels indicates a connection relationship between the nodes in the hierarchical data structure;
- display the list of the nodes in a column browser by providing, in a first column of the column browser, first level nodes associated with a first level of the hierarchical data structure;
- provide, in a second column of the column browser, selectable options associated with a first node of the first level nodes associated with the first level of the hierarchical data structure;
- automatically select, in response to a selection of a first selectable option of the selectable options associated with the first node of the first level nodes provided in the second column, one or more inherited options; and
- provide an overview comprising a summary of that includes the selected options including the first selectable option and the selected one or more inherited options of interactions with the one or more child nodes of the first node of the hierarchical data structure;
- provide, in the second column, a search field;
- search, in response to a search term being at least partially entered into the search field, for the search term in the first level of the hierarchical data structure and in one or more levels below the first level of the hierarchical data structure; and
- provide, while continuing to provide in the first column of the column browser the first level nodes associated with the first level of the hierarchical data structure, search results for the search term in the second column of the column browser, wherein the search results include links to nodes associated with the search results.

16. The non-transitory computer-readable storage medium of claim 15, wherein the instructions further cause the computing system to:
deselect one or more mutually exclusive options based on a selection of a second selectable option of the selectable options.

17. The non-transitory computer-readable storage medium of claim 15, wherein the selected options in the overview further comprises links to nodes associated with the selected options.

* * * * *